(12) United States Patent
Schlipf et al.

(10) Patent No.: US 9,609,806 B2
(45) Date of Patent: Apr. 4, 2017

(54) AUTOMATIC CALIBRATION SYSTEM FOR HEADER HEIGHT CONTROLLER WITH OPERATOR FEEDBACK

(71) Applicant: Headsight, Inc., Bremen, IN (US)

(72) Inventors: Robert Schlipf, Nappanee, IN (US); Johnathan Rassi, Goshen, IN (US); Nathan Virkler, Phoenix, AZ (US)

(73) Assignee: Headsight, Inc., Bremen, IN (US)

( * ) Notice: Subject to any disclaimer, the term of this patent is extended or adjusted under 35 U.S.C. 154(b) by 0 days.

(21) Appl. No.: 14/767,491

(22) PCT Filed: Feb. 12, 2014

(86) PCT No.: PCT/US2014/016104
§ 371 (c)(1),
(2) Date: Aug. 12, 2015

(87) PCT Pub. No.: WO2014/127043
PCT Pub. Date: Aug. 21, 2014

(65) Prior Publication Data
US 2016/0007531 A1    Jan. 14, 2016

Related U.S. Application Data

(60) Provisional application No. 61/763,903, filed on Feb. 12, 2013.

(51) Int. Cl.
*A01D 41/14* (2006.01)
*A01D 41/127* (2006.01)

(52) U.S. Cl.
CPC ........... *A01D 41/127* (2013.01); *A01D 41/14* (2013.01); *A01D 41/141* (2013.01)

(58) Field of Classification Search
CPC ........ A01D 41/00; A01D 41/06; A01D 41/14; A01D 41/141; A01D 41/127
USPC ..................... 56/10.2 E, 10.2 R, 208; 701/50
See application file for complete search history.

(56) References Cited

U.S. PATENT DOCUMENTS

| | | | | |
|---|---|---|---|---|
| 3,623,301 A | * | 11/1971 | Freidrich-Wilheim Hofer et al. | A01B 63/10 56/10.4 |
| 3,704,574 A | * | 12/1972 | Gardner | A01D 41/141 56/10.2 R |
| 3,707,834 A | * | 1/1973 | Schumaker, II | A01D 41/141 56/208 |
| 4,193,250 A | * | 3/1980 | Kessens | A01D 41/141 56/208 |
| 5,155,984 A | * | 10/1992 | Sheehan | A01D 41/141 56/10.2 E |
| 5,600,941 A | * | 2/1997 | Strosser | G01V 3/10 340/684 |

(Continued)

*Primary Examiner* — Robert Pezzuto
(74) *Attorney, Agent, or Firm* — Thomas J. Oppold; Larkin Hoffman Daly & Lindgren, Ltd.

(57) ABSTRACT

Method of calibrating a header height controller responsive to signal outputs from a plurality of height sensors mounted to a header, the signal outputs are variable in magnitude with respect to changes in height of the header relative to a surface. The methods automatically and accurately calibrate header control systems to eliminate the need for manual calibration and provides feedback to the operator to ensure the quality of the calibration and to assist the operator in identify potential problems with sensors or header setup which could affect the operation and performance.

55 Claims, 11 Drawing Sheets

(56) References Cited

U.S. PATENT DOCUMENTS

| | | | | |
|---|---|---|---|---|
| 6,513,311 B1* | 2/2003 | Berger | ............... | A01D 34/006 56/10.2 R |
| 7,647,753 B2* | 1/2010 | Schlipf | ............... | A01D 41/141 56/10.2 E |
| 7,872,587 B2* | 1/2011 | Hindryckx | ............ | A01D 41/127 340/684 |

* cited by examiner (Set Point A)

(Set Point B)

(Set Point C)

| Measured | Sensor | | |
| --- | --- | --- | --- |
| | Left | Center | Right |
| SetPoint A | 4.02 | 4.05 | 3.97 |
| SetPoint B | 2.05 | 2.10 | 2.03 |
| SetPoint C | 1.80 | 1.82 | 1.75 |

Score 94 out of 100

| Calculated | Left | Center | Right | Max | Min | Avg | Wt Factor | Penalty |
| --- | --- | --- | --- | --- | --- | --- | --- | --- |
| Gain | 3.50 | 3.70 | 3.50 | 3.70 | 3.50 | 3.57 | 15 | −0.84 |
| SetPoint B Time | 1.75 | 1.70 | 1.73 | 1.75 | 1.70 | 1.73 | 40 | −1.16 |
| SetPoint A to B | 1.97 | 1.95 | 1.94 | 1.97 | 1.94 | 1.95 | 15 | −0.23 |
| SetPoint B to C | 0.25 | 0.28 | 0.28 | 0.28 | 0.25 | 0.27 | 30 | −3.33 |

FIG. 11
(Good Score)

(Right Snout Misadjusted – Too Steep)

(Ground Unlevel – High in Center)

(Good Score)

| Measured | Sensor | | |
|---|---|---|---|
| | Left | Center | Right |
| SetPoint A | 4.02 | 4.05 | 3.97 |
| SetPoint B | — | — | — |
| SetPoint C | 1.80 | 1.57 | 1.05 |

| Calculated | Left | Center | Right | Max | Min | Avg | Wt Factor | Penalty |
|---|---|---|---|---|---|---|---|---|
| SetPoint A to C | 2.22 | 2.48 | 2.92 | 2.92 | 2.22 | 2.54 | 50 | −13.78 |
| L to R Swing Diff | 2.22 | — | 2.92 | 2.92 | 2.22 | 2.57 | 50 | −13.62 |

Score 73 out of 100

FIG. 15

(Passing Score, But Ground Unlevel; High on Right)

AUTOMATIC CALIBRATION SYSTEM FOR HEADER HEIGHT CONTROLLER WITH OPERATOR FEEDBACK

BACKGROUND

Modern combine harvester headers, whether for corn, small grain or other crops, can exceed 40 feet in width. With these massive headers mounted to combine harvesters weighing in excess of 30 tons, traveling between five to ten miles per hour during harvesting operations, it has become essential to use header height sensors and header control systems which are properly calibrated in order to avoid the headers from being inadvertently run into the ground when encountering terrain elevation changes, which can result in delays and tens of thousands of dollars in repair costs. Header height sensors and proper calibration of the header control system are even more critical in challenging harvest conditions, such as when harvesting "downed crop," when it is necessary to run the header close to the ground.

U.S. Pat. No. 7,647,753 ("the '753 patent") issued to Headsight, Inc., is directed to a system and a method for improving the responsiveness of header height control systems. The '753 patent describes a height sensor disposed with respect to the header to generate a signal varying in magnitude with respect to changes in distance between a pre-established point on the header and the ground. The magnitude of the generated signal when the header is at a predefined set point is determined. For generated signal magnitudes indicating the header is below the set point, the signal magnitudes are operably modified by applying a "gain value." For generated signal magnitudes indicating the header is above the set point, the signal magnitudes may be modified by applying a different gain value. The application of a gain value or different gain values depending on the height of the header above or below the set point improves the responsiveness of the header height control system to changes in terrain.

While the commercial embodiment of the '753 patent (sold under the trademark Foresight® by Headsight, Inc., 3529 Fir Road, Bremen, Ind. 46506) has enjoyed tremendous commercial success, it has been found that some operators are not taking the time to properly calibrate their header control systems or operators are not properly determining the "gain values" to be applied at the different header heights, thereby adversely affecting the responsiveness of the header control systems to changes in terrain.

Accordingly, there is a need for a system that will automatically and accurately calibrate header control systems to eliminate the need for an operator to manually calibrate the header control system and to avoid operator errors. Furthermore, there is a need for a system that will provide feedback to the operator to ensure the quality of the calibration and to assist the operator in identify potential problems with sensors or header setup which could cause calibration errors or imprecise calibrations.

DESCRIPTION OF THE DRAWINGS

FIG. 11 is an example of height sensor output signal values for a corn header resulting in a good calibration score.

FIG. 15 is an example of height sensor output signal values for a non-pivoting header resulting in a passing calibration score but indicating the ground is not level where the calibration was performed.

DESCRIPTION

Figure 1:
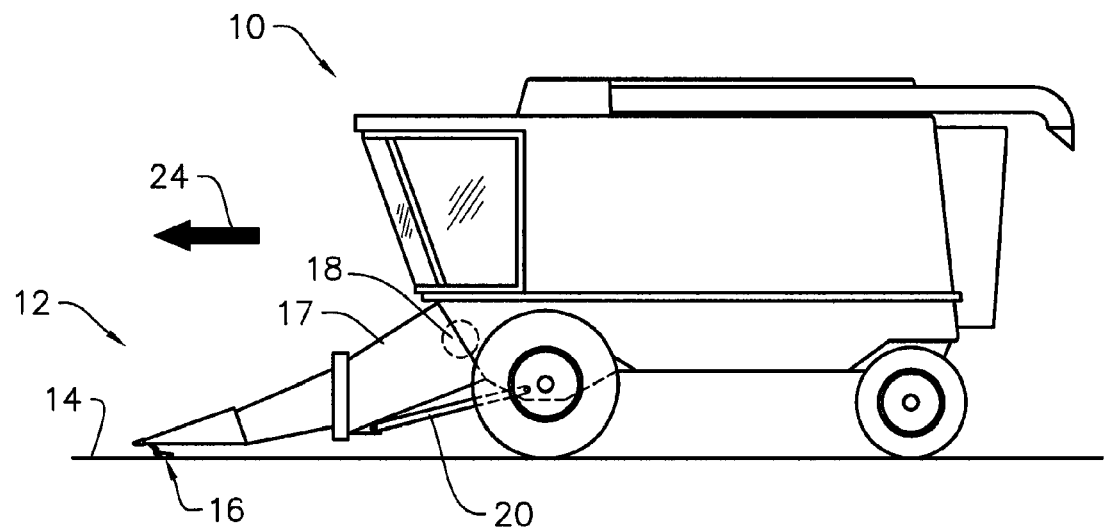
FIG. 1 illustrates a conventional combine with a corn header mounted thereon and showing a height sensor in the form of a height sensing arm mounted near a snout tip of one of the crop divider snouts.
Figure 2:
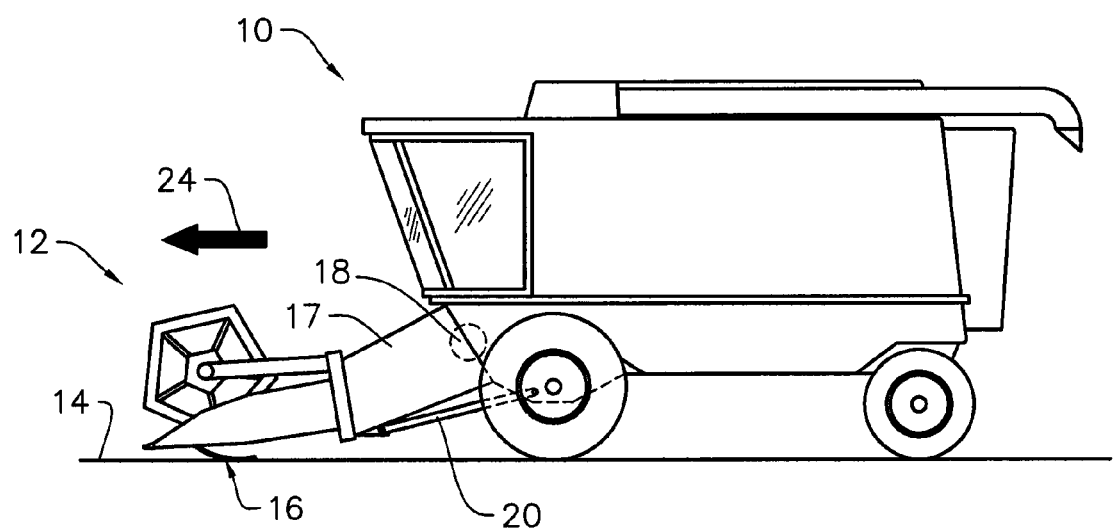
FIG. 2 illustrates a conventional combine with a grain header mounted thereon and showing a height sensor in the form of a height sensing arm mounted near the forward end of the grain head.

Referring now to the drawings, wherein like reference numerals designate identical or corresponding parts throughout the several views, FIGS. 1 and 2 illustrate a machine (such as an agricultural combine harvester) indicated generally by reference numeral 10 having an attachment 12 (such as a "header") mounted thereon. A control system 100 (FIG. 10) is responsive to signal outputs from a plurality of height sensors 16 mounted to the attachment 12 to effect raising and lowering of the attachment 12 with respect to a surface 14. The signal outputs from the height sensors 16 are variable in magnitude with respect to changes in height of the header 12 relative to the surface 14.

While this description and the drawing figures reference and depict an agricultural combine harvester and height sensors used to effect raising and lowering of the header attachment, it should be understood that the term "machine" should be understood to include any type of agricultural, industrial, or other machine. Additionally, for purposes of this description the term "header" should be understood to include any type of attachment, whether permanently affixed to or integral with the machine or whether removable from the machine where such attachment is raised or lowered with respect to a surface. Also, for purposes of this description, the term "height sensor" should be understood to include any type of contact sensor or non-contact sensor that is capable of generating output signals variable in magnitude with respect to elevation changes of the header 12 relative to the ground. For example, contact sensors may include, but are not limited to, ground contacting pivoting arms coupled to rotational or position sensors for detecting the angular or linear position of the arm. Non-contact sensors may include, but are not limited to ultrasonic or laser sensors. Furthermore, as used herein, the term "signal output" should be understood as meaning or including any signal value or signal characteristic generated by a height sensor 16 that may be used for indicating header height relative to a surface, including voltage, current, pulse width, etc.

In FIGS. 1 and 2, the machine 10 is shown as an agricultural combine harvester and the header 12 is shown as a corn header in FIG. 1 and as a grain header in FIG. 2. In both embodiments, the height sensors 16 are shown as being mounted to the forward ends of the headers 12 and the headers 12 are mounted in a conventional manner to the forward end of the feeder house 17 of the combine 10. As is conventional, the rearward end of the feeder house 17 is pivotally connected to the main body of the combine 10 as represented by pivot point 18. As is also conventional, hydraulic cylinders 20 are pivotally connected at one end to the main body of the combine 10 and at their other end to the forward end of the feeder house 17. Thus, it should be appreciated that by actuating the cylinders 20 using the header control system 100, the feeder house 17 and the header 12 mounted thereto may be raised and lowered substantially vertically, but in a broad arc about the pivot point 18.

Figure 3:
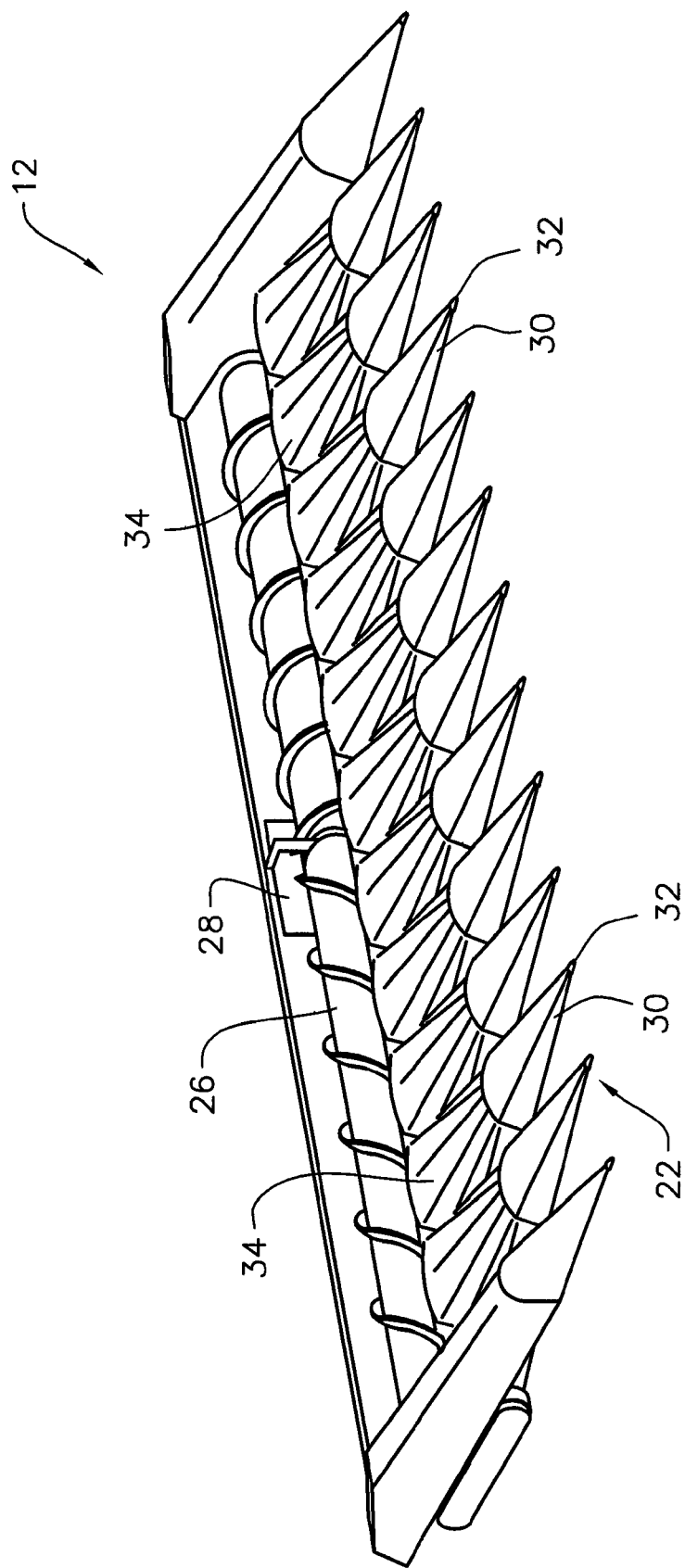
FIG. 3 is a perspective view of a typical corn header.

FIG. 3 is a perspective view of a typical corn header 12. The header 12 includes a plurality of crop dividers 22. The header 12 is shown as a twelve-row header, in that there are twelve spaces between the rearwardly converging crop dividers 22 into which the rows of the corn to be harvested are gathered. Header widths may vary and typically range from four rows up to twenty four rows.

Referring to FIGS. 1 and 3, in operation when harvesting corn, as the combine is driven forwardly as indicated by arrow 24 in FIG. 1, the corn stalks will be gathered between the rearwardly converging crop dividers 22. As the combine proceeds forwardly, the ears are stripped from the stalks and the loose ears, husks and other gathered crop debris and are augured toward the central area of the header 12 by the rotating transverse auger 26. The harvested ears of corn then pass through the central opening 28 in the back of the header 12 and are then conveyed by the feeder house 17 into the interior of the combine. Within the body of the combine, the ears of corn are husked and shelled. The husks, the shelled cobs, and other unwanted crop debris is discharged out the rear of the combine while the shelled corn kernels are augured into a temporary holding tank until being unloaded.

Figure 4:
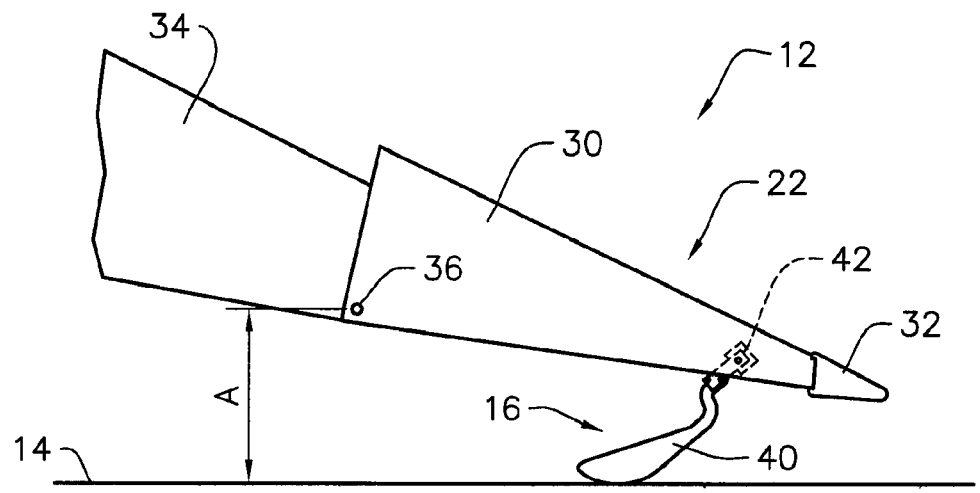
FIG. 4 is a side elevation views of the corn header of FIGS. 1 and 3 shown at Set Point A.
Figure 5:
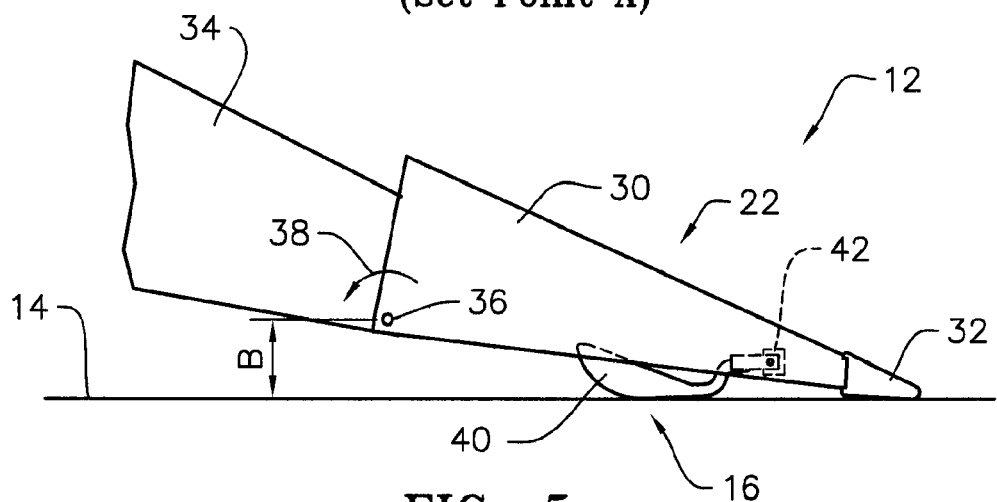
FIG. 5 is a side elevation view of the corn header of FIG. 4 illustrating further pivoting movement of the height sensing arm as the header is further lowered toward the ground to Set Point B.
Figure 6:
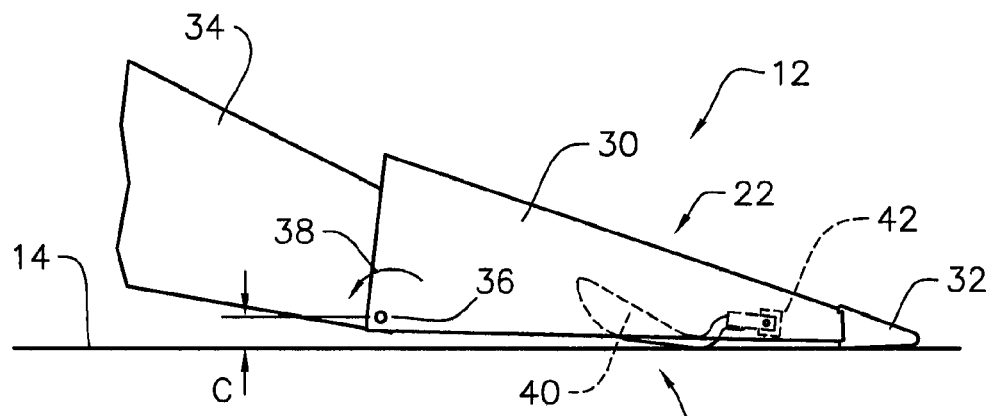
FIG. 6 is a side elevation view of the corn header of FIG. 5 illustrating further pivoting movement of the height sensing arm as the header is further lowered toward the ground to Set Point C and illustrating the pivoting movement of the crop-divider snouts after the snout tips contact the ground.

Referring to FIGS. 3 and 4, each crop divider 22 comprises a semi-conical forward portion or snout 30 and a semi-cylindrical rearward portion 34. Each snout 30 typically includes a hardened or impact resistant point or tip 32. The semi-conical snout 30 is pivotally mounted by bolts or pins 36 (FIG. 4) to the semi-cylindrical rearward portion 34 which is fixed relative to the rest of the header. FIGS. 4-6 illustrate the ability of the snouts 30 to pivot with respect to the fixed rearward portions 34 about the pin 36 as indicated by arrow 38 when the snout tip 32 contacts the ground surface 14. The angle of the snouts 30 with respect to the fixed rearward portion 34 are adjustable by any conventional means, such as by a chain linkage or other adjustable mechanism, so the snouts 30 may be set at a desired angle relative to the fixed rearward portions 34.

As best illustrated in FIGS. 4-6, disposed below the header 12 and preferably mounted near the tip 32 of the snouts 30 is a height sensor 16. The header 12 will typically include multiple height sensors 16 evenly spaced across the width of the header. For example, it is typically desirable to have a height sensor mounted to the outermost crop dividers 22 with one height sensor mounted on the middle crop divider or two or more height sensors evenly spaced between the outermost crop dividers 22 depending on the width of the header. The height sensors 16 cooperate with the header height control system 100 to effect header height changes as described later. In addition, if the combine is so equipped, the height sensor in combination with the height control system may also affect lateral tilt of the header if the ground elevation is higher on one side versus the other.

In the embodiment illustrated in FIGS. 4-6, the height sensor 16 is shown as a spring-biased arm 40 to which is coupled a rotational sensor 42 at a forward end thereof. The rotational sensor 42 may be a potentiometer or any other electronic or magnetic height sensor capable of generating an output signal in response to the angular or linear position of the arm 40. The output signals of the height sensors 16 vary in magnitude in relation to the rotational position of the arm 40 with respect to the header, thereby establishing a generally proportional relationship between the height of the header 12 above the ground surface. One suitable spring-biased arm with rotational sensor is disclosed in U.S. Pat. No. 6,202,395 to Gramm, the commercial embodiment of which is distributed by Headsight, Inc., 3529 Fir Road, Bremen, Ind. 46506.

FIGS. 4-6 illustrate the vertical movement of the pivoting element of the header 12 (i.e., the snouts) and the rotation of the height sensor 16 as the header is lowered between "Set Point A", "Set Point B" and "Set Point C" corresponding to the heights "A", "B" and "C" of the pivot point 36 of the header above the ground surface. Set Point A, may be any point or height where the snout tips (i.e, the pivoting element of the header) is not yet in contact with the ground surface. However, for purposes of this description, Set Point A, as shown in FIG. 4, is assumed to correspond to the height "A" of the pivot point 36 nearest the ground but where the arm and rotational sensor have not yet begun to rotate so that the output signal of the rotational sensor is at its maximum. FIG. 5 illustrates an example of Set Point B, which corresponds to the height "B" of the pivot point 36 above the ground surface when the snout tip 32 makes first contact with a ground surface 14 (i.e., where the pivoting element begins to pivot). FIG. 6 illustrates an example of Set Point C which corresponds to the height "C" of the pivot point 36 above the ground surface when the header is at its lowest point (e.g., when the skids of the corn header are on the ground).

In other embodiments it should be appreciated that Set Point A may be any elevation above Set Point C, particularly if non-contact sensors are employed for detecting the height or position above a surface to defined the upper range at which the header is expected to operate.

Figure 7A:
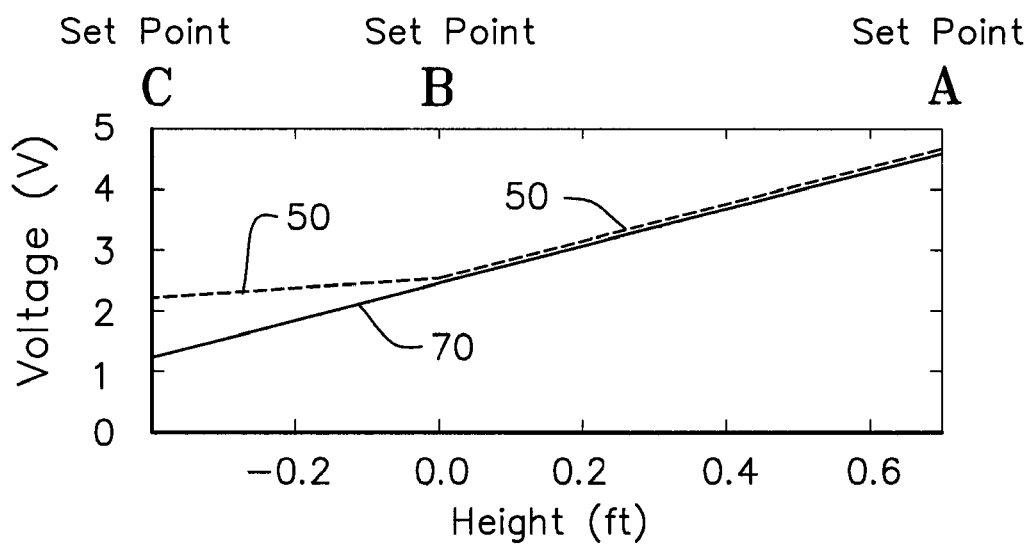
FIG. 7A is a diagram representing the change in height sensor output signal (in volts) with respect to height as the header is lowered from Set Point A to Set Point C. The solid line represents the modified output signal between Set Points A, B and C (i.e., "gain" applied) versus the unmodified output signal (dashed line).
Figure 7B:
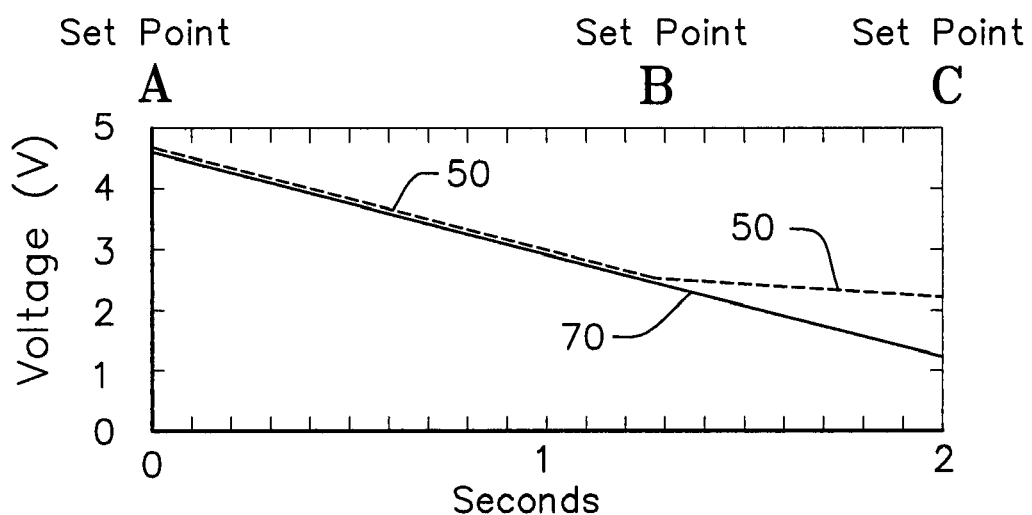
FIG. 7B is a diagram representing the change in height sensor output signal (in volts) with respect to time as the header is lowered from Set Point A to Set Point C. The solid line represents the modified output signal between Set Points A, B and C (i.e., "gain" applied) versus the unmodified output signal (dashed line).

FIGS. 7A and 7B, are illustrations of a plot of a representative sample of the output signal of the height sensor 16 (represented in volts, for purposes of this example) in relation to vertical movement of the header as it moves between Set Point A, Set Point B and Set Point C. In FIG. 7A, the output signals are plotted in relation to the actual height of the header above the ground, whereas in FIG. 7B, the output signals are plotted in relation to time as the header is lowered at a constant rate between Set Points A and C. It should be appreciated that the plotted curve and/or linearity and slope of the output signal of the height sensor will vary depending on the shape of the height sensing arm and/or the type of height sensor used and its position on the header.

Continuing to refer to FIGS. 7A and 7B, the output signal of the height sensor 16 in relation to the vertical height of the header 12 is substantially linearly proportional to the height of the header until the snout tip 32 makes contact with the ground surface 14 (i.e., Set Point B as illustrated in FIG. 5). This is due to the fact that, as previously discussed, the snout 30 (to which the height sensor 16 is attached), is pivotable with respect to the rear portion 34 of the crop divider 22 about pin 36. Accordingly, once the snout tip 32 contacts the ground, as the header 12 continues to be lowered, the snout 30 will begin to pivot about pin 36 as indicated by arrow 38 in FIG. 5 as the rear portion 34 of the crop divider 22 continues to move downwardly with the rest of the header 12. As a result, it should be appreciated that the actual header height will no longer have the same substantially linear proportionality to the rotational movement of the arm 40 because the rotation of the arm 40 will change very little relative to the snout once the snout tip touches the ground. The same change in linearity of the output signal magnitude would occur as well with other types of height sensors, such as non-contact sensors.

Continuing to refer to FIGS. 7A and 7B, the scale range of the magnitude of the output signal of the height sensor 16 is shown as being between 0 to 5 volts because most conventional combine header control systems accept voltage inputs between 0.5 volts and 4.5 volts. Accordingly, for purposes of this description, the output voltage at Set Point A of the height sensor 16 is preferably about 4.4 volts, which is within the 4.5 maximum voltage range accepted by most combine header control systems, while also allowing a slight margin for error. It should be appreciated that any particular magnitude of signal ranges may be used. As indicated by dashed line 50, the plotted voltage output to header height between Set Points A and B is substantially linear. However, as the header continues to move downwardly beyond Set Point B, the slope of the dashed line 50 changes significantly because the actual header height no longer has the same substantially linear proportionality to the rotational movement of the arm 40 because the rotation of the arm 40 changes very little relative to the snout due to the snout pivoting.

Figure 8:
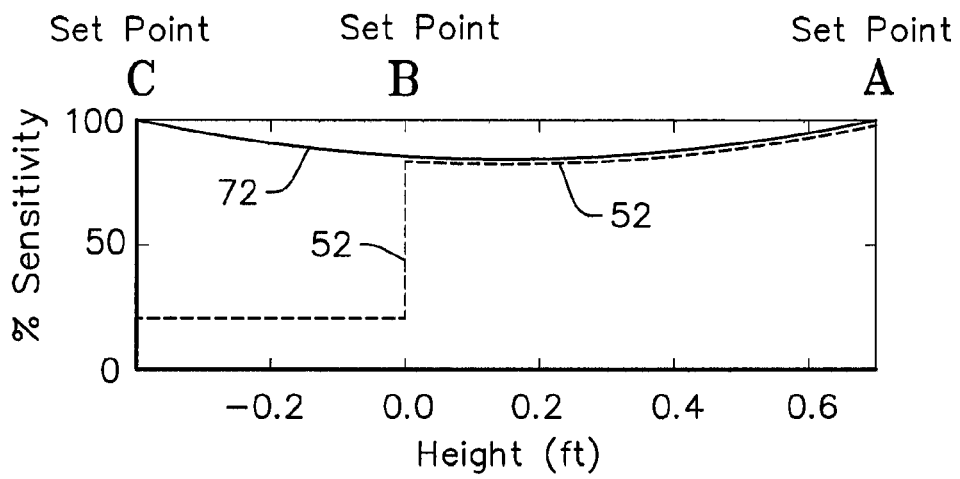
FIG. 8 is a diagram representing the change in sensitivity as a percentage of the overall sensitivity of the height sensor as the header is lowered from Set Point A to Set Point C. The solid line represents the modified sensitivity between points A, B and C versus the unmodified sensitivity (dashed line).

The diagram of FIG. 8 represents a plot of the sensitivity of the sensor versus the change in height between Set Points A, B and C. Again, it should be appreciated that the plotted curve and/or linearity and slope will vary depending on the shape of the height sensing arm and/or the type of height sensor used and its position on the header. As illustrated, the plot of the sensitivity of the height sensor versus the change in height between Set Points A, B and C, as represented by dashed line 52 remains substantially constant between Set Points A and B, but beyond Set Point B, the sensitivity drops dramatically (to as low as 20% of the maximum) due to the pivoting of the snout.

Figure 9A:
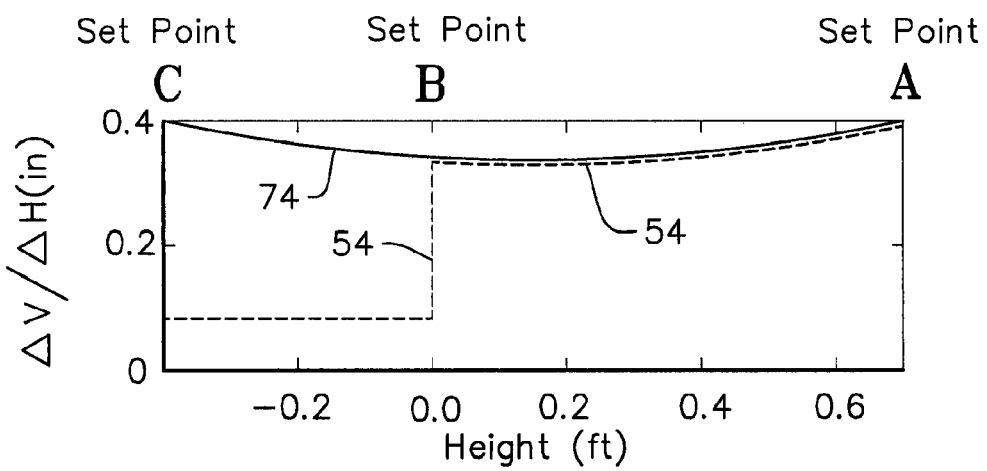
FIG. 9A is another diagram representing the change in the height sensor output signal (in volts) per change in height ($\Delta V/\Delta H$) as the header is lowered from Set Point A to Set Point C. The solid line represents the modified $\Delta V/\Delta H$ between Set Points A, B and C versus the unmodified $\Delta V/\Delta H$ (dashed line).
Figure 9B:
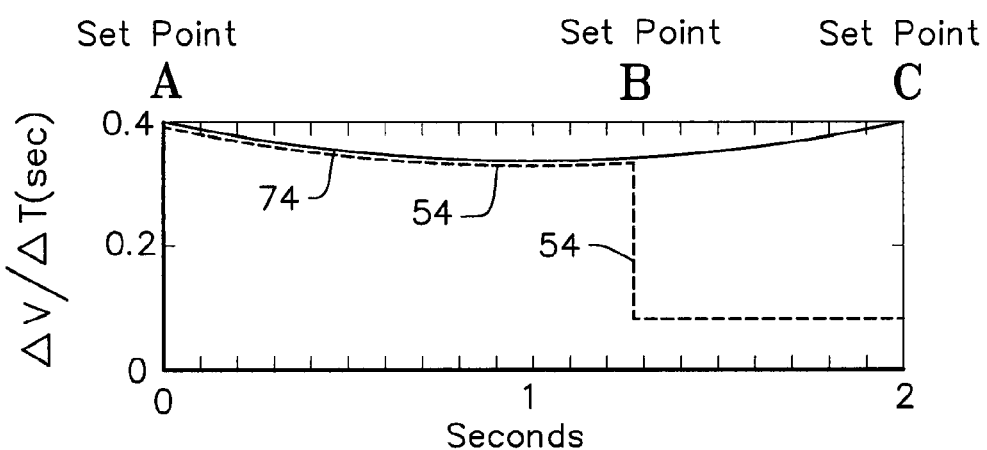
FIG. 9B is another diagram representing the change in the height sensor output signal (in volts) per change in time ($\Delta V/\Delta T$) as the header is lowered from Set Point A to Set Point C. The solid line represents the modified $\Delta V/\Delta T$ between Set Points A, B and C versus the unmodified $\Delta V/\Delta T$ (dashed line).

FIG. 9A is a representative plot of the sensor sensitivity with a vertical scale ranging from 0 to 0.4 $\Delta V/\Delta H$ (i.e., signal output per height) as the header height moves between Set Points A, B and C. FIG. 9B is a representative plot of the sensor sensitivity with a vertical scale ranging from 0 to 0.4 $\Delta V/\Delta T$ (i.e., signal output per time) as the header height moves between Set Points A, B and C. Again, it should be appreciated that the plotted curve and/or linearity and slope will vary depending on the shape of the height sensing arm and/or the type of height sensor 16 used and its position on the header. As illustrated, the sensitivity of the height sensor 16, as represented by dashed line 54, remains substantially constant between Set Points A and B, but below Set Point B, the sensitivity drops dramatically due to the pivoting of the snout.

Figure 10:
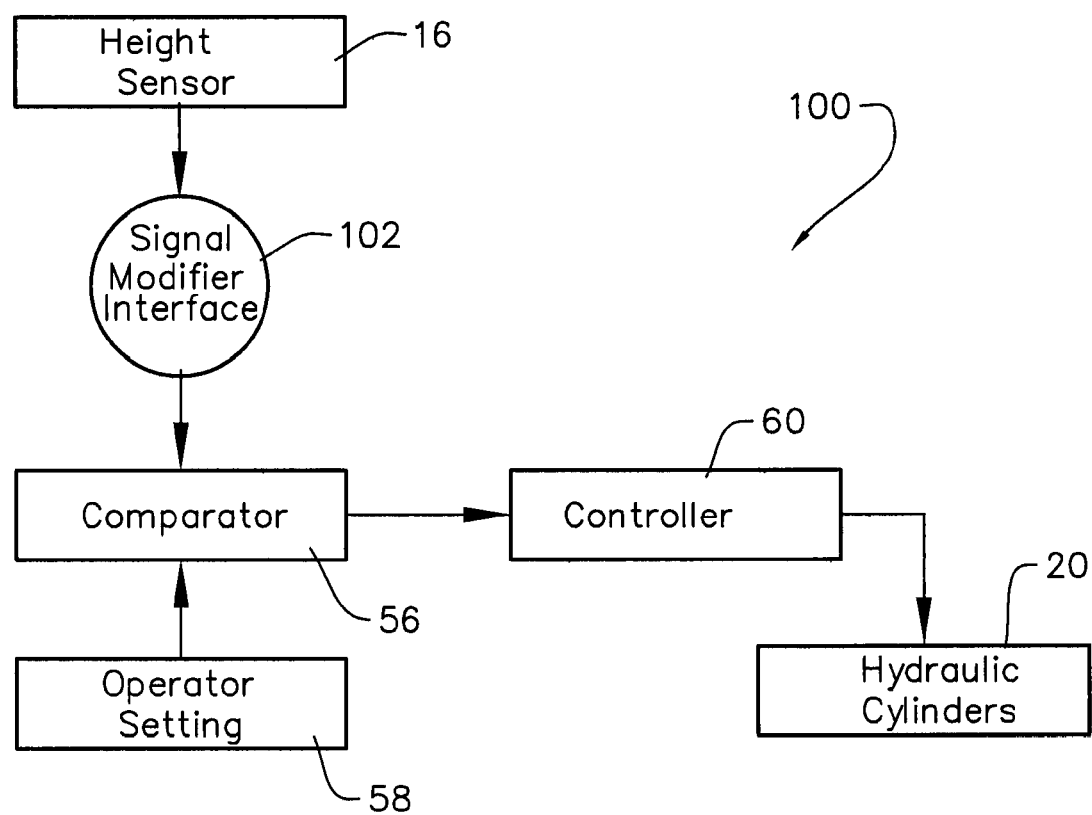
FIG. 10 is a functional block diagram for one embodiment of a control system for raising and lowering a header utilizing a modified signal.

FIG. 10 illustrates an embodiment of a header control system 100. As previously described, the height sensor 16 generates an output signal variable in magnitude with respect to the height of the header relative to the ground, which, in the embodiment shown in FIGS. 4-6, is the rotational position of the arm 40. The output signal is fed to a comparator 56 which also is capable of receiving a signal from the operator setting control 58 establishing the operator's desired operating height for the header (hereinafter the "Set Height") typically set by manipulation of a lever or rotary control in the cab of the combine. The comparator 56 will generate an output signal (hereinafter the "Comparator Output") representative of (e.g., proportional to) the difference between the height of the header relative to the ground as sensed by the height sensor 16 (hereinafter the "Sensed Height") and the Set Height. The Comparator Output is fed to a controller 60 which operably actuates the hydraulic cylinders 20 to raise and lower the header 12. It should be understood that the controller 60 may be a proportional hydraulic control typical of most late model combines, or the controller may be a non-proportional hydraulic control found on older model combines. The comparator 56 may also be incorporated into or form a part of the controller 60 and/or may otherwise be adapted to communicate with the controller 60.

If the Sensed Height is the same as the Set Height (or within the preset "dead band" (discussed below)), the Comparator Output will not cause the controller 60 to actuate the hydraulic cylinders 20. If the terrain inclines, causing the Sensed Height to be below the Set Height, the Comparator Output will cause the controller to actuate the hydraulic cylinders 20 to raise the header 12 until the Sensed Height equals the Set Height. Conversely, if the terrain declines causing the Sensed Height to be above the Set Height, the Comparator Output will cause the controller 60 to actuate the hydraulic cylinders 20 to lower the header 12 until the Sensed Height equals the Set Height. To prevent excessive oscillation of the controller 60 and hydraulic cylinders 20, the controllers are generally programmed or programmable with a "dead band" whereby the Comparator Output indicating only slight differences in the Sensed Height on either side of the Set Height will be ignored by the controller 60 (i.e., the controller 60 will not actuate the hydraulic cylinders 20).

It should also be appreciated that because the effective sensitivity of the height sensor 16 is decreased below Set Point B (due to the reduced relative movement of the sensor in relation to the snout), as represented by dashed lines 52 and 54 in FIGS. 8 and 9 respectively, the dead band will undesirably effectively increase at this most critical height. For example, assume the operator sets the Set Height such that the snout tip is at ground level and the controller 60 is programmed or set to have a dead band of one inch on either side of the Set Height. Under these conditions, if the terrain suddenly increases by three inches, for example, due to the poor sensitivity of the height sensor 16 at this height, the sensor may not detect the change in terrain to cause the comparator 56 to generate a Comparator Output signal. Furthermore, due to the decreased effective sensitivity of the height sensor 16 at this height, the Comparator Output typically will not accurately represent the true height of the header above the ground surface. Additionally, if this inaccurate Comparator Output is still within the dead band range, the controller 60 will not actuate the hydraulic cylinders 20. Thus, under such circumstances, the header could potentially impact the ground before the controller 60 actuates the hydraulic cylinders 20 to raise the header.

Accordingly, as recognized and disclosed in the '753 patent, it is desirable to improve the effective sensitivity of the height sensor near and below Set Point B so as to improve the responsiveness of the header height control system when the snouts 30 are being run at or near ground level. To accomplish the desired improved responsiveness, the magnitude of the signal indicating the header height is modified by applying a "gain" factor or multiplier to the signal when the height of the header is detected as being at or below Set Point B. As represented in FIG. 10, the output signal of the height sensor is modified by a signal modifier interface 102 which modifies the output signal from the height sensors 16 before the output signal reaches the comparator 56. One suitable signal modifier interface 102 is a programmable digital microcontroller interface, such as the Insight® control box available from Headsight, Inc., 3529 Fir Road, Bremen, Ind. 46506.

The interface 102 may be disposed at the rear of the harvesting header in such a location that it may be connected to the existing electronic connections on the combine's feeder house 17. It should be appreciated, however, that modification of the signal may take place at any point in the header control system 100 between the height sensor 16 and the output of the controller 60. For example, the output of the comparator 56 and/or controller 60 may be modified by programming the controller 60 to modify the signal to apply the appropriate gain value (discussed below) and/or by calibrating the controller 60 to effectively apply the desired gain value(s) to the controller output signal. Thus, it should also be appreciated that the interface 102 or functionality of the interface 102 may be incorporated into or form a part of the controller 60. Alternatively, the modification of the signal could take place at or within the height sensor itself if the sensor is capable of being programmed to apply a gain or multiplier before outputting the signal.

As disclosed in the '753 patent, one method of modifying the signal to account for the loss of effective sensitivity of the sensor below Set Point B, is to determine the magnitude of the signal when the header is at Set Point B (hereinafter referred to as the "Set Point B Magnitude" (SPBM). With the SPBM known, for any signals generated by the rotational sensor that have a magnitude greater than the SPBM, it is known that the header is positioned above Set Point B. It follows, then, that if the generated signal of the rotational sensor is less than the SPBM, then the header is known to be below Set Point B. The gain factor or multiplier may then be applied to the signal when the signal magnitude is less than the SPBM so as to improve the responsiveness of the header height control system when the header is at or below Set Point B.

The gain factor used for signals above Set Point B (hereinafter the "Above B Gain" (ABG) is preferably about one, but may be any whole or fractional number. The gain factor used for signals below Set Point B (hereinafter the "Below B Gain" (BBG) is preferably more than one to about ten times greater than the ABG. The gain factor used for the BBG and for the ABG (if any) is preferably such that, after applying the gain factor, the slope of the plot of the magnitude of the height sensor output signal versus the header height is substantially constant across the entire height range of the header from Set Point A to Set Point C as indicated by solid line 70 in FIG. 7, for example. It should be appreciated that by making the signal magnitude substantially linear across the entire height range of the header from Set Point A to C, the effective sensor sensitivity will necessarily be made substantially uniform as indicated by solid lines 72 and 74 in FIGS. 8 and 9, respectively.

The '753 patent disclosed that Set Point B (and thus the SPBM) may be determined manually by visually identifying when the snout tip touches the ground and identifying the SPBM at that point. The '753 patent also disclosed automatically detecting the point at which the snout touches the ground by employing other sensors to detect when the snout begins to rotate. In the embodiment disclosed herein, the need for visually identifying when the snout tips touch the ground or the need to employ additional sensors to detect pivotal movement of the snout become unnecessary.

Furthermore, the '753 patent disclosed that the BBG and ABG gain factors may be determined manually or automatically, but both the manual and automatic determination of the BBG and ABG gain factors as disclosed in the '753 patent were dependent upon the position and geometry of the height sensors 16 and the distance from the tip of the snout to the pivot point 36. In the embodiment disclosed herein, the BBG and ABG gain factors may be determined independently of the geometry or position of the height sensors 16 and/or the distance from the snout tip to the pivot point.

Automatic Calibration of Header Controller when the Height Sensor is Mounted on a Pivoting Element of the Header To calibrate the header control system 100 to automatically determine Set Point B and the gain factor to be applied, the output signal magnitudes of the height sensors are sampled and recorded with respect to the change in height of the header as it moves through a range of motion in order to correlate the output signal magnitudes with respect to the actual height of the header above the ground. The range of motion may be from a raised position to a lowered position or from a lowered position to a raised position. The correlation of the output signals to actual height of the header above the ground may be determined by sampling the output signals of the height sensors as the header is moved through a range of motion at a constant speed or by associating the output signals of the height sensors with other positional sensors monitoring another element of the machine 10 to which the header 12 is attached, for example the positional sensors on the feeder house 17 of the combine.

For example, in one embodiment the operator may be instructed to raise the header to its maximum height and to then begin lowering the header at a constant drop speed or drop rate until the header is resting on the ground (i.e., Set Point C). As the header is being lowered, the signal modifier interface 102 (e.g., the Insight® controller as previously referenced) will sample the output signals across all the height sensors 16. A sampling rate of 100 Hz may be suitable, but other desired sampling rates may also be used. Assuming the same representative output signals as discussed above in connection with FIG. 7B, it should be appreciated that the height sensor output signals will remain substantially constant and will presumably be at their maximum due to being fully extended (e.g., 4.5 V) until the header is lowered to the point that one of the height sensors 16 makes contact with the ground surface and begins to rotate. Upon detecting the first output signal change from the height sensor, the interface 102 initiates a clock or timer to time stamp the first output signal change, and records the output signal magnitude at that first time stamp thereby establishing Set Point A and the "Set Point A Magnitude" (SPAM) for that height sensor. This same process occurs for each of the height sensors.

As the header continues to lower at a constant rate to the Set Point C position, the interface 102 continues to successively time stamp and record the height sensor output signals at the sampling rate (e.g., 100 Hz) for each of the height sensors. When the header reaches the Set Point C position and the interface 102 detects the last change to the height sensor output signal over a predetermined sampling period, the timer is stopped establishing the Set Point C position and the last to change output signal magnitude is recorded as the "Set Point C Magnitude" (SPCM). This same process occurs for each of the height sensors.

In an alternative embodiment, for example, as the header is being lowered or raised, the signal modifier interface 102 (e.g., the Insight® controller as previously referenced) may be programmed to sample the output signals across all the height sensors 16 based on incremental signal changes received from the position sensors of the feeder house 17 or other positional sensor associated with movement of the header 12. For example, the interface 102 may be programmed to record the output signal magnitudes of each of the height sensors at every 0.01 voltage change of the feeder house position sensor. Thus, assuming the feeder house is first raised to its maximum height and is then lowered, upon detecting the first output signal change from the height sensor, the interface 102 records the output signal magnitude from the height sensor and the associated output signal from the feederhouse position sensor, thereby establishing Set Point A and the SPAM for that height sensor relative to the feeder house height. This same process occurs for each of the height sensors. As the header continues to be lowered, the interface 102 may be programmed to record the signal magnitudes from each of the height sensors at every 0.01 voltage change of the feeder house sensors until the feeder house position sensor indicates that the feeder house is at its lower most position establishing the Set Point C position at which point the interface 102 records the output signals of each of the height sensors 16 at that position, thereby establishing the SPCM for each of the height sensors.

In an alternative embodiment in which non-contact sensors are employed, once the SPCM is established by sampling the output signal magnitude when the header is lowered to the Set Point C position (i.e., the lowest point in the range of motion of the header), which may be detected by the position sensors on the feederhouse or other supporting element associated with movement of the header, the Set Point A position and thus the SPAM may be established at any desired elevation above the Set Point C position, such as at the upper height or elevation at which the header is expected to operate in the field.

With all the output signals recorded across each of the height sensors between Set Point A and Set Point C, deviations in the rate of change of the signal magnitudes between Set Point A and C can be identified by analyzing the differences in the recorded signal magnitudes between the successive samplings (i.e, whether based on time stamps or the incremental signal changes of an associated position sensor). For example, by comparing the difference between the SPAM and the signal magnitude of the next successive sampling point, the initial rate change or slope will be substantially linear with the next successive signal magnitude until the snout tip makes contact with the ground at which point the slope will begin to change. Accordingly, if the interface 102 is programmed to compare each one of the successively recorded signal magnitudes beginning with the SPAM, the interface will be able to identify the first occurrence of nonlinearity which will establish the "Set Point B" position and the corresponding SPBM. The same process may be performed for each of the height sensors.

With SPBM now known, the interface 102 is programmed to calculate the difference in the slope of the output signal from Set Point A to Set Point B (i.e., the slope of the line 70 in FIG. 7) versus the slope from Set Point B to Set Point C (i.e., the slope of the dashed line 50 in FIG. 7 to the left of Set Point B). The differences in the slopes from Set Point A to B and from Set Point B to C, will correspond to the gain factor that is needed to modify the signal magnitudes which are below the SPBM to bring them into substantial linearity with the slope from Set Point A to B. Alternatively, once the SPBM is identified, it may be desirable to consider a subset of the signal magnitudes on either side of the SPBM for purposes of comparing the slopes on either side of the SPBM to take into account any nonlinearity of the slopes of the signal magnitudes in a range closer to the SPBM.

The recorded signal magnitudes may be correlated with the corresponding actual heights of the header above the ground surface by associating the signal magnitudes between Set Points A, B and C with the known height sensor or height sensor arm configuration and known header configurations based on make and model of the combine and header previously programmed into the interface 102 or input into the combine monitor with which the interface 102 interfaces. For example, if the output signals at Set Points A, B and C are recorded, these values can be correlated with expected output signals at Set Points A, B and C preprogrammed into the interface 102 for different makes and models of combines, headers and sensors 16. If discrepancies are identified between the actual output signals from the expected output signals at Set Points A, B and C for the known makes and models, this information can also be used to diagnose set-up errors with the header or problems with the sensors as discussed later under the Calibration Score and Operator Feedback section of this disclosure.

The interface 102 is programmed to apply BBG to any detected output signal magnitudes that are below the SPBM in order to modify the slope of the output signal below Set Point B (i.e., from Set Points B to C or a subset thereof) to have the same or substantially the same slope as the output signal above Set Point B (i.e., from Set Points B to A or a subset thereof). If an ABG is desired to modify the output signals greater than the SPBM, the interface 102 may be programmed to apply any pre-programmed whole or fractional number to those output signals greater than the SPBM.

With the BBG and ABG gain factors known, the modified output signal corresponding to header heights above Set Point B may be represented by the following equation:

Modified Signal Above Set Point B=SPBM+((measured signal magnitude−SPBM)×ABG)

Similarly, the modified signal corresponding to header heights below Set Point B may be represented by the following equation:

Modified Signal Below Set Point B=SPBM−((SPBM−measured signal magnitude)×BBG)

It should be appreciated that by applying the different gain values to the output signal magnitudes above and below Set Point B as discussed above, the effective sensor sensitivity will be uniform or more substantially uniform as indicated by solid lines 72 and 74 in FIGS. 8 and 9A, 9B respectively, from Set Point A to Set Point C, thereby improving the responsiveness of the header height control system when the crop divider snout tips are being run at or near on the ground surface.

It should also be appreciated that in order to ensure that modified output signal magnitudes are within the acceptable input ranges for the comparator 56/controller 60 (e.g. between ranges between 0.5 volts and 4.5 volts), it may be necessary to shift the output signal magnitudes. For example, if the slope of the output signals in FIG. 7A, 7B was steeper due to a different sensing arm configuration such that the actual detected output signal magnitude of the sensor at Set Point C was found to be 2.0 volts thereby resulting in a modified signal magnitude at Set Point C (i.e. SPCM) being 0.4 volts (i.e., 2.6−((2.6−2.0)×3.5), then it would be necessary to shift the signal plot upwards while maintaining the same slope to ensure that the header controller system would still receive this modified signal at Set Point C. One way to provide such a magnitude shift while maintaining the same slope is to set the actual magnitude of the signal at Set Point A (i.e., SPAM) to the maximum signal range and adjusting all the detected signals by this incremental difference. For example if the actual detected SPAM is 3.4 volts, all of the detected signal magnitudes may be adjusted upwardly by 1 volt such that the SPAM is reset to 4.4 volts (the maximum voltage accepted by most header control systems while allowing for a slight margin of error). The corresponding SPCM will thus be 1.4 volts (i.e., 0.4+1.0).

Although the embodiment described herein describes the pivot point 36 as the pre-established point on the header for determining header height above the ground surface, it should be appreciated that Set Point B may be a reference to any point on the header above the ground surface at which there is a discontinuity in the slope of the output signal. The purpose of which is simply to identify the magnitudes of the signal from the height sensor 16 at Set Point B (wherever the reference point may be) so that the resulting output of the comparator 56/controller 60 can be modified as described above.

It should also be noted that some height sensors 16 are configured to generate signals with opposite magnitudes than described above, i.e., signals of greater magnitude are generated at lower header heights and signals of lower magnitude are generated at higher header heights. For simplicity, it is presumed that the height sensor generates lower magnitude signals below Set Point B than above Set Point B. However, header height control systems may alternatively utilize signal magnitudes which are inverted (i.e., higher magnitude signals above Set Point B than below Set Point B). Therefore, any discussion in this specification or in the appended claims with respect to the signal magnitudes increasing above Set Point B or decreasing below Set Point B should be understood as being equally applicable to systems in which the signal magnitudes of the height sensors are switched above and below Set Point B.

Automatic Calibration of Header Controller when the Height Sensor is not Mounted on a Pivoting Element of the Header.

The foregoing system and method of calibrating header controllers for headers in which the sensor is mounted to a pivoting element (e.g., the snouts on corn headers) is substantially the same for calibrating header controllers where the height sensor is not mounted on a pivoting element, such as on platform headers and draper headers for harvesting small grain (collectively hereinafter "non-pivoting headers"). However, in such applications, it should be appreciated that because the sensor is not mounted on a pivoting element, there will be no abruptly change in the signal magnitudes between Set Points A and C and therefore it is unnecessary to perform the steps identify above to detect the Set Point B position and/or the SPBM for purposes of applying a BBG value to the signals. Otherwise all of the foregoing embodiments and methods are equally applicable to non-pivoting headers.

Calibration Score and Operator Feedback

The current state of the art in header controls simply provides the operator with pass/fail messages, such as "Calibration Failed-Sensor voltage too low" or "Calibration Failed-Sensor swing less than 2.0V." While such pass/fail systems provide operators with feedback to identify and resolve major problems with the header height sensors, such pass/fail systems do not provide the operator with much confidence that the calibration of the height sensors are accurate or that the header and/or sensors are properly set up for optimum performance.

To provide the operator with confidence that the calibration of the header height controller is accurate and that the header 12 and sensors 16 are properly set up, the interface 102 may be programmed to analyze the recorded signal magnitudes for purposes of characterizing the ranges and responses of the height sensors for purposes of identify similarities or discrepancies of the signal magnitudes across the sensors at various positions (e.g., at Set Points A, B and C) or differences between the recorded signal magnitudes and the expected signal magnitudes or other anomalies. This information can then be used to provide feedback to the operator in a form that will provide the operator with confidence that the header control is properly calibrated for dependable performance and/or feedback that will identify header or sensor setup errors and/or suggest possible resolutions of detected anomalies that may affect performance.

Figure 12:
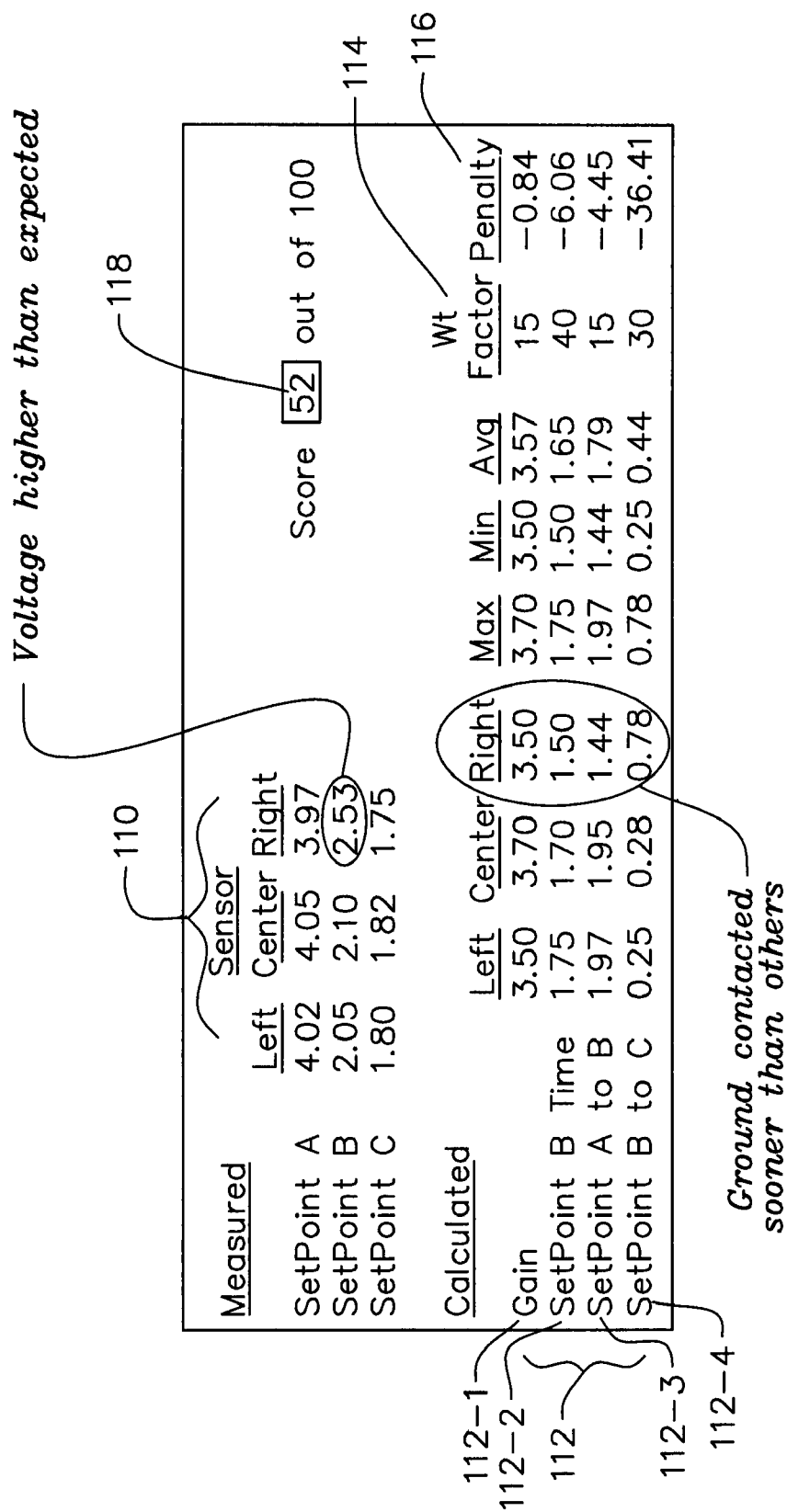
FIG. 12 is an example of height sensor output signal values for a corn header resulting in a poor calibration score due to an improperly adjusted snout (hanging too steep).
Figure 13:
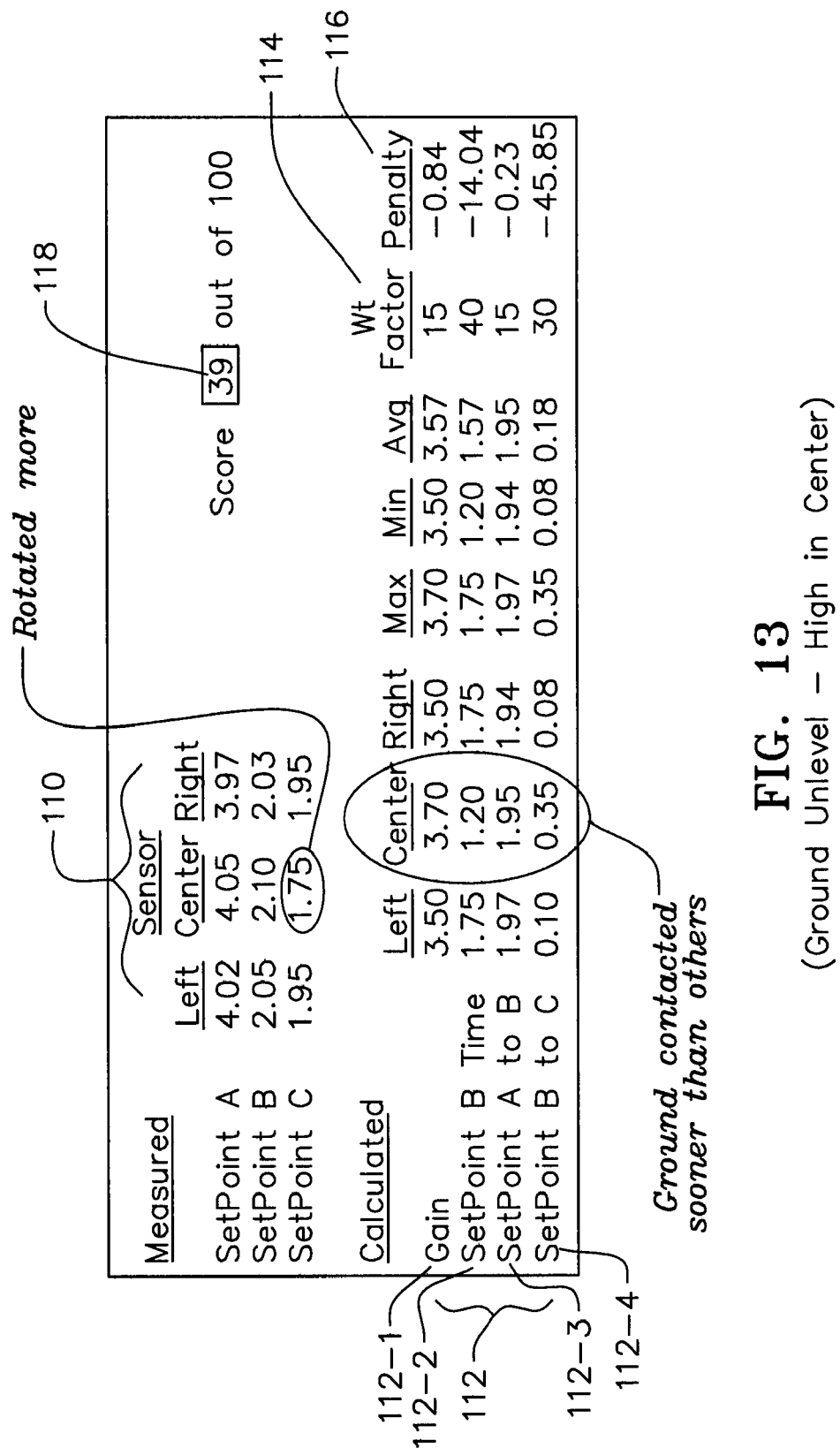
FIG. 13 is an example of height sensor output signal values for a corn header resulting in a poor calibration score due to the ground not being level where the calibration was performed.
Figure 14:
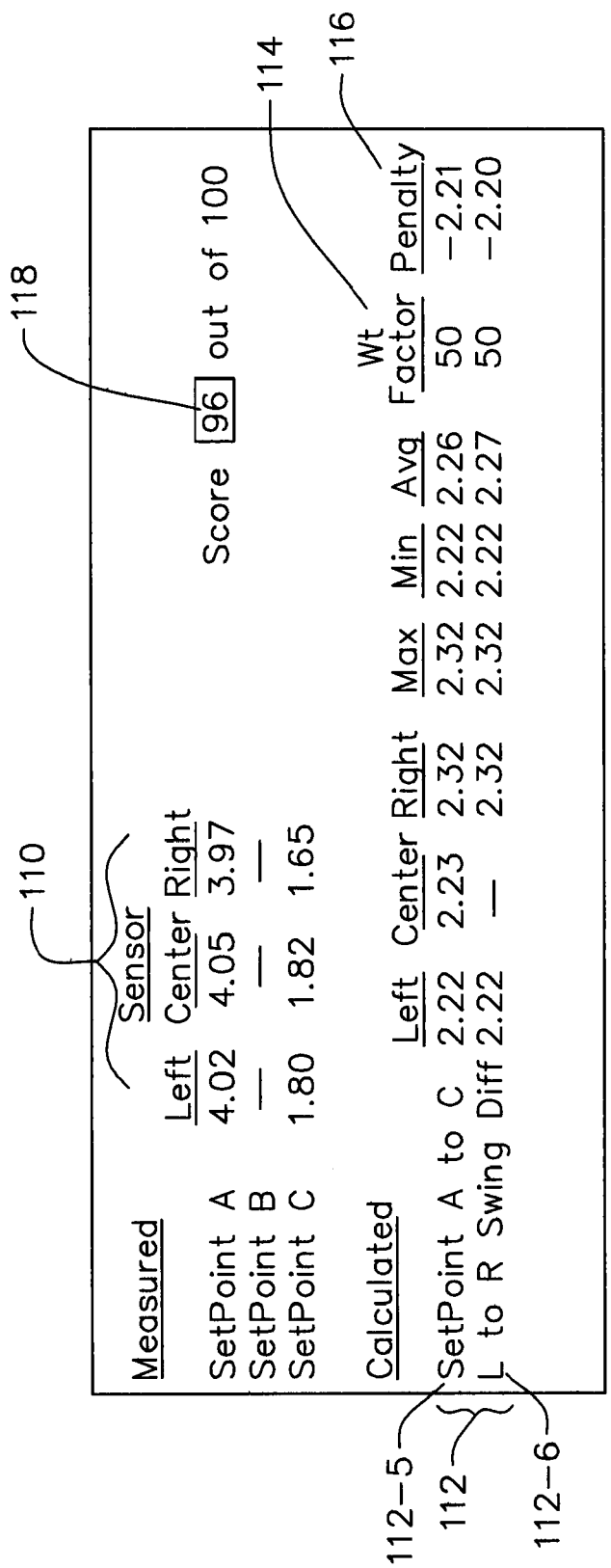
FIG. 14 is an example of height sensor output signal values for a non-pivoting header resulting in a good calibration score.

FIGS. 11-15 illustrate one embodiment for providing feedback to an operator in the form of a calibration score. For purposes of this embodiment, it is assumed that the header has three height sensors 16 (i.e., a "left" sensor, a "right" sensor and a "center" sensor). However, it should be appreciated that the header may have as few as one or two height sensors or four or more height sensors depending on the header width, in which case, the output signals would be recorded for each of the height sensors. The examples of FIGS. 11-13 are examples applicable to headers in which the height sensor is mounted to a pivoting element (e.g., corn headers), whereas FIGS. 14 and 15 are examples applicable to non-pivoting headers (e.g., grain headers).

Referring to FIG. 11, the measured output signal values 110 at Set Point A, Set Point B and Set Point C (i.e., SPAM, SPBM and SPCM) are recorded for each of the three left, right and center height sensors 16. It being understood that the SPBM is derived from identifying the change in slope of the signal magnitudes as described above. These measured output signal values 110 are then used in establishing scoring factors 112 for each of the left, right and center height sensors 16 installed on the header 12. In the examples of FIGS. 11-13, the scoring factors 112 include the "Gain" factor 112-1 (determined as identified above); the "Set Point B Time" factor 112-2 (which is the time detected for the header to be lowered from Set Point A to Set Point B); the "Set Point A to B" factor 112-3 (which is the difference between the SPAM and the SPBM); and the "Set Point B to C" factor 112-4 (which is the difference between the SPBM and the SPCM). Other suitable scoring factors for characterizing the range and response of the height sensors may also be used or taken into account.

Based on the calculated values for each of the scoring factors 112, the maximum values ("Max"), the minimum values ("Min") and the average values ("Avg") across all height sensors are identified or calculated. These values are then used in connection with a weighting factor ("Wt Factor") 114 to determine a "Penalty" value 116 for each scoring factor 112. The weighting factors 114 used for each scoring factor 112 may vary depending on the importance attributed to each scoring factor 112 based on experience or testing. For example, a weighting factor of "15" is assigned to the "Gain" scoring factor 112-1, whereas a weighting factor of "40" is assigned to the "Set Point B Time" scoring factor 112-2. Thus, for purposes of this embodiment, it is deemed that deviations of the time period for a sensor to detect movement from Set Point A to Set Point B (i.e., Set Point B Time scoring factor 112-2) has a greater effect on performance of the header control system than deviations of the Gain values and therefore a higher Weighting factor 114 is attributed to the Set Point B Time scoring factor 112-2 than the Gain scoring factor 112-1. As an example, the Penalty value 116 for the Gain scoring factor 112-1 is calculated as follows:

$$\text{Penalty} = \left(\frac{\text{Max} - \text{Min}}{\text{Avg}}\right) \times \text{Wt Factor}$$

$$\text{Penalty} = \left(\frac{3.70 - 3.50}{3.57}\right) \times 15 = 0.84$$

To determine the calibration score 118, the sum of the Penalty values 116 for each of the scoring factors 112 is subtracted from a maximum score value of "100". In the example of FIG. 11, the calibration score 118 is calculated to be a value of "94". This is deemed a "good" score indicating that the header height control is properly calibrated and that the set up of the header and height sensors are proper. A calibration score of 60 or less is deemed a "poor" or "failing" score indicating that there is a lack of confidence in the calibration of the header height control system. Of course, it should be understood that providing a calibration score is but one of many possible embodiments for providing an operator with feedback so the operator has confidence that the header control is properly calibrated for dependable performance. Furthermore, with respect to providing a calibration score, there are many possible methods for determining a calibration score. For example rather than determining a penalty to be subtracted from a maximum score, the scoring factors may be additive to produce a calibration score. Furthermore, any score range or manner of identifying a scoring-type attribute may be used. Additionally, any method of calculating a penalty value or additive value may be used for characterizing an effect on the performance of the header control system.

In another example as shown in FIG. 12, based on the factors previously discussed in the example of FIG. 11, the calibration score 118 is calculated to be a value of "52". By referring to the Penalty values 116 in FIG. 12, it can be seen that a significant penalty is applied for the "Set Point B to C" scoring factor 112-4. An analysis of the values for the "Set Point B to C" scoring factor 112-4 shows that the "right" sensors were contacting the ground sooner than the left and center sensors indicating an improper set up of the header or height sensors.

In yet another example as shown in FIG. 13, the calibration score is 118 is calculated to be a value of "39", which is very poor score, indicating that there is a significant lack of confidence in the calibration of the header height control system. By referring to the Penalty values 116, it can be seen that significant penalties were applied for the "Set Point B to C" scoring factor 112-4 and for the "Set Point B Time" scoring factor 112-2. An analysis of the values for the "Set Point B to C" scoring factor 112-4 shows that the "center" sensors were contacting the ground sooner than the left and right sensors indicating an improper set up of the header or height sensors. Furthermore, an analysis of the measured values reveals that the voltage signal for the center sensor at Set Point C is lower than the voltage signal for the left and right sensors indicating that the center sensor was rotated more than the left and right sensors. These combinations of factors indicate that the ground on which the calibration process was performed is not level, and in particular, it indicates that the ground was higher in the middle of the header than at the ends.

In the example of FIG. 14, representing data for a non-pivoting header, different weighting factors 114 and scoring factors 112 are shown. Again, other suitable weight factors and scoring factors for characterizing the range and response of the height sensors may also be used or taken into account. In the example of FIG. 14, a weighting factor of "50" is assigned to the "Set Point A to C" scoring factor 112-5 (which is the difference between the SPAM and the SPCM), and a weighting factor of "50" is assigned to the "L to R Swing Diff" scoring factor 112-6 (which is the difference between the SPAM and the SPCM of the left and right sensors only). In the example of FIG. 14, the calibration score 118 is calculated to be a value of "96". This is deemed a "good" score indicating that the header height control is properly calibrated and that the set up of the header and height sensors are proper.

In the example of FIG. 15, the calibration score is 118 is calculated to be a value of "73", which is an acceptable score, but is low, indicating that confidence in the calibration is not very high. By referring to the Penalty values 116, it can be seen that significant penalties were applied to the "Set Point A to C" scoring factor 112-5 and for the "L to R Swing Diff" scoring factor 112-6. An analysis of these values shows that the "right" sensors were contacting the ground sooner than the left and center sensors indicating an improper set up of the header or height sensors. Furthermore, an analysis of the measured values reveals that the voltage signal for the right sensor at Set Point C is lower than the voltage signal for the left and center sensors indicating that the right sensor was rotated more than the left and center sensors, and that the center sensor was rotated more than the left sensor. These combinations of factors indicate that the ground on which the calibration process was performed was not level, and in particular, it indicates that the ground was higher on the right side of the header than at the left side.

In addition to the calibration score providing feedback to give the operator a sense of confidence in the calibration of the header height control system, the interface 102 can be programmed to provide operator feedback based on an analysis of the data. As identified above in connection with FIGS. 12 and 13, the interface 102 can be programmed to recognize certain anomalies in the measured and calculated data to suggest possible corrections.

For example, with respect to the calculated values in FIG. 12, it was apparent that the right sensors were contacting the ground earlier than the left and center sensors. This would indicate that either the ground is not level (i.e., higher under the right side of the header) or that the right sensor is hanging lower than the other sensors. By cross referencing the measured values, another anomaly indicates that the voltages for the right sensor at Set Points A and C are lower than the voltage signals of the left and center sensors at Set Points A and C, but the voltage signals of the right sensor at Set Point B are higher than the left and center sensors at Set Point B. This anomaly, indicates that the right snout tip made contact with the ground sooner and began to pivot sooner than the left and right snouts because there was less of a voltage change from Set Point A to B than expected in comparison to the voltage changes of the left and center snouts from Set Point A to B. Based on this data, the interface 102 could be programmed to display a message that the "Right snout angle is too steep" for example.

Similarly, with respect to FIG. 13, a comparison of the anomalies in the calculated and measured values indicated that the ground was higher in the middle of the header than at the ends. Thus, the interface 102 could be programmed to display a message that the "Ground is not level—high in center," for example.

Similarly, with respect to FIG. 15, a comparison of the anomalies in the calculated and measured values indicated that the ground was higher on the right side of the header than on the left side. Thus, the interface 102 could be programmed to display a message that the "Ground is not level—high on right," for example.

Other types of feedback may also be provided to the operator. For example, if the "right" height sensor is not properly mounted or is faulty causing a significant anomaly of the SPAM, SPBM and/or SPCM in comparison to the corresponding values for the left and center sensors, the interface 102 may be programmed to display a message such as "Check right sensor."

The foregoing are but a few examples of the type of operator feedback that could be provided based on an analysis of anomalies in the measured output signals or the calculated values that are within the scope of possible operator feedback information.

The foregoing description is presented to enable one of ordinary skill in the art to make and use the invention and is provided in the context of a patent application and its requirements. Various modifications to the preferred embodiment of the system, and the general principles and features of the system and methods described herein will be readily apparent to those of skill in the art. Thus, the present invention is not to be limited to the embodiments of the system and methods described above and illustrated in the drawing figures, but is to be accorded the widest scope consistent with the spirit and scope of the appended claims.

The invention claimed is:

1. A method of calibrating a header height controller, the header height controller comprising processing circuitry capable of receiving output signals from a plurality of height sensors mounted to a header, the output signals variable in magnitude with respect to changes in height of the header relative to a surface, the header height controller responsive to the output signals from the plurality of height sensors, the method comprising the steps of:
   moving the header through a range of motion relative to the surface;
   as the header moves through the range of motion, receiving and storing at predetermined sampling intervals the output signal magnitudes for each of the plurality of height sensors;
   defining a Set Point C Magnitude ("SPCM") for each of the plurality of height sensors, wherein the SPCM is the magnitude of the output signal when the header is at an elevation in the range of motion where a last appreciable change occurs in the output signal magnitudes between one of the sampling intervals and a preceding one of the sampling intervals;
   defining a Set Point A Magnitude ("SPAM") for each of the plurality of height sensors, wherein the SPAM is the magnitude of the output signal at a predetermined elevation in the range of motion above the elevation corresponding to the SPCM.

2. The method of claim 1 wherein the SPAM is defined by the sampling interval where a first appreciable change occurs in the output signal magnitudes between one of the sampling intervals and a preceding one of the sampling intervals.

3. The method of claim 1 wherein the SPCM is defined by a position sensor associated with movement of a supporting element of the header, whereby when the position sensor identifies when the header is at a bottom of the range of motion, the output signal magnitudes of each of the plurality of heights sensors are stored.

4. The method of claim 1, further comprising the step of:
   defining a Set Point B Magnitude ("SPBM") for each of the plurality of height sensors, wherein the SPBM is the magnitude of the output signal at the sampling interval where a first appreciable deviation occurs in a rate of change of the output signal magnitudes between the SPAM and SPCM.

5. The method of claim 4, further comprising the step of:
   applying a gain value to substantially linearize the rate of change of the output signal magnitudes between the SPBM and the SPCM with the rate of change of the output signal magnitudes between the SPBM and the SPAM.

6. The method of claim 1, wherein the header is moved through the range of motion at a substantially constant rate and the predetermined sampling intervals are time intervals.

7. The method of claim 1, wherein the predetermined sampling intervals are incremental changes in signal magnitude of a position sensor associated with movement of a supporting element of the header.

8. The method of claim 6, wherein each of the output signal magnitudes of each of the plurality of height sensors is time stamped as the header moves through the range of motion.

9. The method of claim 7, wherein each of the output signal magnitudes of each of the plurality of height sensors is associated with the corresponding incremental changes in signal magnitude of the position sensor.

10. The method of claim 1 further comprising the step of:
identifying anomalies between the output signal magnitudes across the plurality of height sensors at predefined points of the sampling intervals.

11. The method of claim 4 further comprising the step of:
identifying anomalies between the output signal magnitudes across the plurality of height sensors at predefined points of the sampling intervals.

12. The method of claim 10 further comprising the step of:
characterizing expected performance of the header height controller under operating conditions based on the anomalies.

13. The method of claim 11 further comprising the step of:
characterizing expected performance of the header height controller under operating conditions based on the anomalies.

14. The method of claim 12 wherein the predefined points of the sampling intervals correspond to the sampling intervals at the SPAM and SPCM.

15. The method of claim 13, wherein the predefined points of the sampling intervals correspond to the sampling intervals at the SPAM, SPBM and SPCM.

16. The method of claim 14, wherein the anomalies include discrepancies between values of SPAM and SPCM of the outermost ones of the plurality of height sensors.

17. The method of claim 14, wherein the anomalies include discrepancies between values of SPAM and SPCM across the plurality of height sensors.

18. The method of claim 15, wherein the anomalies include discrepancies between values of SPAM, SPBM and SPCM across the plurality of height sensors.

19. The method of claim 12 wherein the characterization of the expected performance of the header height controller includes a calibration score.

20. The method of claim 19 wherein the calibration score is based on scoring factors of predefined relative importance attributed to differences in the output signal magnitudes and expected signal magnitudes of the plurality of height sensors.

21. The method of claim 13 wherein the characterization of the expected performance of the header height controller includes a calibration score.

22. The method of claim 21 wherein the calibration score is based on scoring factors of predefined relative importance attributed to differences in the output signal magnitudes and expected signal magnitudes of the plurality of height sensors.

23. The method of claim 10 further comprising the step of:
displaying recommendations viewable to an operator based on the identified anomalies.

24. The method of claim 11 further comprising the step of:
displaying recommendations viewable to an operator based on the identified anomalies.

25. The method of claim 12 further comprising the step of:
displaying recommendations viewable to an operator based on the characterized expected performance of the header height controller.

26. The method of claim 13 further comprising the step of:
displaying recommendations viewable to an operator based on the characterized expected performance of the header height controller.

27. The method of claim 19 further comprising the step of:
displaying recommendations viewable to an operator based on the calibration score.

28. The method of claim 23, wherein the recommendations include characterizations of the surface.

29. The method of claim 23, wherein the recommendations include identifying if elements of the header are improperly positioned.

30. The method of claim 23, wherein the recommendations include identifying if one of the plurality of height sensors needs attention.

31. The method of claim 21 further comprising the step of:
displaying recommendations viewable to an operator based on the calibration score.

32. The method of claim 24, wherein the recommendations include characterizations of the surface.

33. The method of claim 24, wherein the recommendations include identifying if elements of the header are improperly positioned.

34. The method of claim 24, wherein the recommendations include identifying if one of the plurality of height sensors needs attention.

35. A method of calibrating a header height controller, the header height controller comprising processing circuitry capable of receiving output signals from a plurality of height sensors mounted to a header, the output signals variable in magnitude with respect to changes in height of the header relative to a surface, the header height controller responsive to the output signals from the plurality of height sensors, the method comprising the steps of:
moving the header through a range of motion between a raised position in which the header is at an elevation above the surface where no portion of the header is in contact with the surface and a lowered position in which the header is in contact with the surface;
as the header moves through the range of motion, receiving and storing at predetermined sampling intervals the output signal magnitudes for each of the plurality of height sensors;
defining a Set Point B Magnitude ("SPBM") for each of the plurality of height sensors, wherein the SPBM is the magnitude of the output signal at an elevation in the range of motion where a first appreciable deviation occurs in a rate of change of the output signal magnitudes between one of the sampling intervals and a preceding one of the sampling intervals.

36. The method of claim 35 further including:
defining a Set Point C Magnitude ("SPCM") for each of the plurality of height sensors, wherein the SPCM is the magnitude of the output signal in which the header is at an elevation in the range of motion below the elevation corresponding to the SPBM;
defining a Set Point A Magnitude ("SPAM") for each of the plurality of height sensors, wherein the SPAM is the magnitude of the output signal in which the header is at an elevation in the range of motion above the elevation corresponding to the SPBM.

37. The method of claim 36, further comprising the step of:
applying a gain value to substantially linearize the rate of change of the output signal magnitudes between the SPBM and the SPCM with the rate of change of the output signal magnitudes between the SPBM and the SPAM.

38. The method of claim 35, wherein the header is moved through the range of motion at a substantially constant rate and the predetermined sampling intervals are time intervals.

39. The method of claim 35, wherein the predetermined sampling intervals are incremental changes in signal magnitude of a position sensor associated with movement of a supporting element of the header.

40. The method of claim 38, wherein each of the output signal magnitudes of each of the plurality of height sensors is time stamped as the header moves through the range of motion.

41. The method of claim 39, wherein each of the output signal magnitudes of each of the plurality of height sensors is associated with the corresponding incremental changes in signal magnitude of the position sensor.

42. The method of claim 36 further comprising the step of:
identifying anomalies between the output signal magnitudes across the plurality of height sensors at predefined points of the sampling intervals.

43. The method of claim 42 further comprising the step of:
characterizing expected performance of the header height controller under operating conditions based on the anomalies.

44. The method of claim 42, wherein the predefined points of the sampling intervals correspond to the sampling intervals at the SPAM, SPBM and SPCM.

45. The method of claim 44, wherein the anomalies include discrepancies between values of SPAM and SPCM of the outermost ones of the plurality of height sensors.

46. The method of claim 44, wherein the anomalies include discrepancies between values of SPAM and SPCM across the plurality of height sensors.

47. The method of claim 44, wherein the anomalies include discrepancies between values of SPAM, SPBM and SPCM across the plurality of height sensors.

48. The method of claim 43 wherein the characterization of the expected performance of the header height controller includes a calibration score.

49. The method of claim 48 wherein the calibration score is based on scoring factors of predefined relative importance attributed to differences in the output signal magnitudes and expected signal magnitudes of the plurality of height sensors.

50. The method of claim 42 further comprising the step of:
displaying recommendations viewable to an operator based on the identified anomalies.

51. The method of claim 43 further comprising the step of:
displaying recommendations viewable to an operator based on the characterized expected performance of the header height controller.

52. The method of claim 48 further comprising the step of:
displaying recommendations viewable to an operator based on the calibration score.

53. The method of claim 50, wherein the recommendations include characterizations of the surface.

54. The method of claim 51, wherein the recommendations include identifying if elements of the header are improperly positioned.

55. The method of claim 52, wherein the recommendations include identifying if one of the plurality of height sensors needs attention.

* * * * *